(12) United States Patent
Nagasaki

(10) Patent No.: US 7,305,102 B2
(45) Date of Patent: Dec. 4, 2007

(54) INFORMATION PROCESSING APPARATUS CAPABLE OF DISPLAYING MAPS AND POSITION DISPLAYING METHOD

(75) Inventor: Katsuhiko Nagasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 861 days.

(21) Appl. No.: 10/446,487

(22) Filed: May 28, 2003

(65) Prior Publication Data

US 2003/0222796 A1  Dec. 4, 2003

(30) Foreign Application Priority Data

May 29, 2002  (JP) .............................. 2002-155708

(51) Int. Cl.
*G06K 9/00* (2006.01)
(52) U.S. Cl. ...................... 382/100; 382/321; 701/200
(58) Field of Classification Search ................ 382/100, 382/103, 104, 107, 113; 701/200, 206, 207, 701/208, 209, 213
See application file for complete search history.

(56) References Cited

U.S. PATENT DOCUMENTS

| | | | | |
|---|---|---|---|---|
| 5,884,218 | A * | 3/1999 | Nimura et al. ............... | 701/208 |
| 6,018,697 | A * | 1/2000 | Morimoto et al. ........... | 701/209 |
| 6,032,098 | A * | 2/2000 | Takahashi et al. ........... | 701/210 |
| 6,452,544 | B1 * | 9/2002 | Hakala et al. ......... | 342/357.13 |
| 2002/0154213 | A1 * | 10/2002 | Sibyama et al. ............... | 348/47 |

FOREIGN PATENT DOCUMENTS

| JP | 02-210483 | 8/1990 |
|---|---|---|
| JP | 09-218955 | 8/1997 |
| JP | 10-170292 | 6/1998 |
| JP | 2000-097714 | 7/2000 |

\* cited by examiner

*Primary Examiner*—Bhavesh M Mehta
*Assistant Examiner*—Anand Bhatnagar
(74) *Attorney, Agent, or Firm*—Fitzpatrick, Cella, Harper & Scinto

(57) ABSTRACT

A method for displaying a locus of positions on a map is disclosed. In the method, positions where images have been picked up by a digital camera device are determined based on characters included in the picked up images, and a locus of the determined positions of the images are displayed on a map to show a route in which the camera device has been transferred. Also, attributes of characters included in a picked up image are judged to decide whether the characters indicate a name of place or a station name, for example, and a map that matches the judgment is displayed. For example, a road map may be displayed when the characters are determined to indicate a name of place, and a railroad route map may be displayed when the characters are determined to indicate a station name. Furthermore, a position determined based on the characters may be displayed on the map that matches the attribute of the characters to show where in the map the image was picked up. Also, a map may be displayed based on characters included in one of picked up images selected by the user such that the user can confirm the place that has been visited. Also, a position determined based on the characters may be displayed on the map to allow the user to confirm details of the place that has been visited in the past.

6 Claims, 15 Drawing Sheets

FIG. 10

| | |
|---|---|
| 1102 | time = 2001/01/27 08:32:36 , latitude = 33.1543° N , longitude = 24.4343° E , 00001.jpg |
| 1103 | time = 2001/05/26 06:15:12 , latitude = 43.3512° N , longitude = 27.2451° E , 00002.jpg |
| 1104 | time = 2001/05/26 19:34:36 , latitude = 43.3526° N , longitude = 27.2500° E , 00003.jpg |
| 1105 | time = 2001/07/11 10:42:12 , latitude = 25.1529° N , longitude = 33.1844° E , 00012.jpg |
| 1106 | time = 2001/07/11 12:24:53 , latitude = 35.1541° N , longitude = 20.1823° E , 00013.jpg |
| 1107 | time = 2001/07/11 13:51:20 , latitude = 35.1576° N , longitude = 20.1848° E , 00014.jpg |

| とうきょう 東京 tokyo | |
|---|---|
| ゆうらくちょう yurakucho | かんだ kanda |

# INFORMATION PROCESSING APPARATUS CAPABLE OF DISPLAYING MAPS AND POSITION DISPLAYING METHOD

BACKGROUND OF THE INVENTION

1. Field of the Invention

The present invention relates to an information processing apparatus that is capable of displaying maps and a position displaying method.

2. Related Background Art

Due to advances in mobile communications technologies in recent years, developments in devices that teach current locations of moving bodies are underway.

For example, a wandering aged person tracking system uses the personal handy-phone system (PHS) technology, and notifies a PHS base station that is located closest to a person (for example, a wandering aged person) who is carrying a mobile communications device of the location of the person. Since, PHS base stations are typically installed at intervals of several hundred meters, the position can be detected in several hundred meters.

Also, the global positioning system (GPS) use satellites to allow navigation, positioning, and other research throughout the world.

However, the conventional positioning technology that uses base stations and satellites to locate current positions entails the following problems.

(1) In the wandering aged person tracking system described above, the position of a person can be detected only within the range of the nearest station, and more precise, specific positioning cannot be provided. Also, the wandering aged person tracking system is currently installed at several locations throughout Japan, the system cannot be used throughout the world. The system cannot be used in areas where radio signals from base stations cannot reach even within Japan.

(2) The GPS needs to receive radio signals from a plurality of satellites; and the GPS cannot be used when radio signals cannot be received, for example, inside buildings or tunnels. Furthermore, due to the fact that position data sent from satellites may be intentionally degraded, an auxiliary system may be required to improve the positioning accuracy, which in turn increases the cost of the device.

SUMMARY OF THE INVENTION

The present invention is provided to improve the usability of information processing apparatuses that are capable of displaying maps.

The present invention provides a system, apparatus and method that specify locations and display the locations on maps without relying on base stations or satellites.

The present invention relates to a system, apparatus and method that specify picked up positions based on images picked up by an image pick up device such as a digital camera, and display a locus of traveling object or person from one picked up position to another.

The present invention also relates to a system, apparatus and method that display maps that match characters in images picked up by a digital camera.

Also, the present invention relates to a system, apparatus and method that display maps based on characters included in any of picked up images that are selected.

Other objects, features and advantages of the invention will become apparent from the following detailed description taken in conjunction with the accompanying drawings.

BRIEF DESCRIPTION OF THE DRAWINGS

FIG. 10 shows an example of a data format stored in a history database.

FIG. 15 shows in support to describe references to judge attributes in accordance with the fourth embodiment.

DESCRIPTION OF THE PREFERRED EMBODIMENTS

Preferred embodiments of the present invention will be described with reference to the accompanying drawings.

First Embodiment

<Hardware Structure of First Embodiment>

Figure 1:
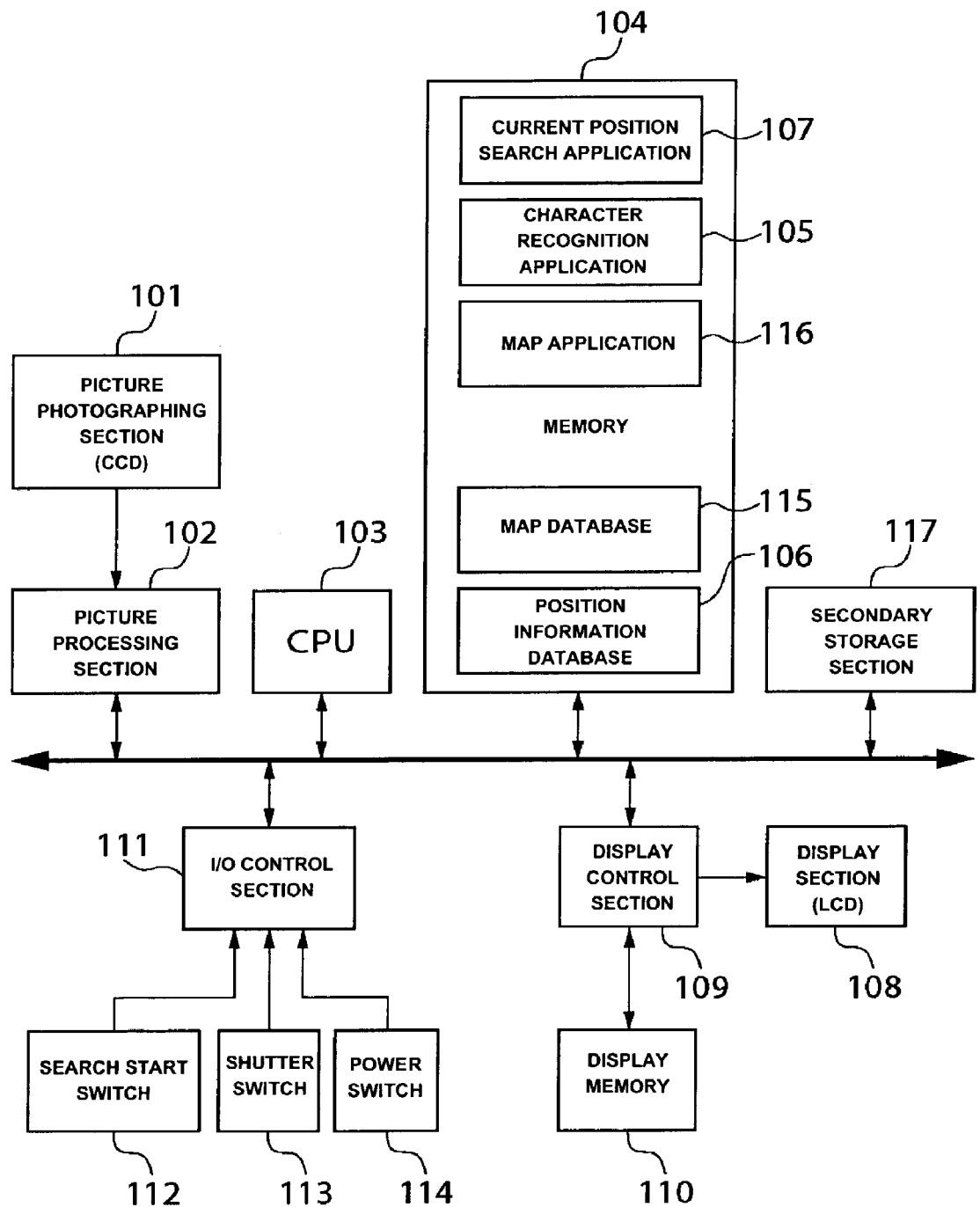
FIG. 1 shows a block diagram of a hardware structure of an information processing apparatus in accordance with a first embodiment of the present invention.

FIG. 1 shows a block diagram of a hardware structure of an information processing apparatus having a digital camera function in accordance with a first embodiment of the present invention.

The information processing apparatus includes a photographing section 101 that is equipped with a function to take pictures through a charge coupled device (CCD) or the like, and a picture processing section 102 that controls the photographing section 101 and processes picture data that is provided from the photographing section 101.

A central processing unit (CPU) 103 controls overall operations of the information processing apparatus, and a memory 104 stores programs that may be executed by the CPU 103. The memory 104 stores a character recognition application 105, a position information database 106, a current position search application 107, a map database 115 and a map application 116.

A display section 108 may be equipped with a liquid crystal display (LCD), and is controlled by a display control section 109 to display pictures, images and/or characters. A display memory 110 stored data to be displayed on the display section 108. An I/O control section 111 controls status management of a search start switch 112, a shutter switch 113, a power switch 114 and the like. A secondary storage section 117 may store pictures taken by a digital camera.

<Operations of First Embodiment>

Operations of the first embodiment will be described with reference to a flow chart shown in FIG. 2.

For example, when the user of the apparatus wants to know the current location of the user, the user first sets the apparatus into a photographing mode (step S201). Then, the photographing section 101 starts taking a picture and transmitting data of the picture, the display control section 109 writes the data transmitted onto the display memory 110, and also displays the data on the display section 108 in real time, in other words, performs a so-called viewfinder display processing (step S202).

The user can depress the shutter switch 113 while focusing at a place name plate or a sign that indicates the current position (step S203), the apparatus performs a processing to take a picture (step S204). More specifically, the I/O control section 111 detects the operation to depress the shutter switch 113, and notifies the CPU 103 of the operation. The CPU 103 instructs the picture processing section 102 to stop taking in pictures, and stores in the secondary storage section 117 picture data taken at the moment when the shutter switch 113 is depressed.

Next, the user depresses the search start switch 112 (step S205). As the I/O control section 111 detects the operation to depress the search start switch 112, it notifies the CPU 103 of the operation. Upon receiving the notice, the CPU 103 instructs the character recognition application 105 to start a character recognition operation. Upon receiving the instruction to start character recognition, the character recognition application 105 performs a character recognition processing on the picture data that was taken immediately before the search start switch 112 was depressed, and stored in the secondary storage 117 (step S206). More specifically, the character recognition application 105 reads the picture data stored in the secondary storage section 117, and recognizes a character string (or character strings) in the data. Any known character recognition technique can be used for the character recognition processing.

When the character string is recognized, character string data obtained as a result of the character recognition processing is send to the current position search application 107. The current position search application 107 performs a position search processing based on the character string data received (step S207). More specifically, the current position search application 107 matches the character string data with the position information database 106, to search position information that matches the character string.

The search result is sent to the map application 116, where a map display processing is performed (step S208). More specifically, the position information searched is compared with the map database 115, and map data including the name of place that matches the position information is displayed on the display section 108.

If the search start switch 112 is not depressed in step S205, the elapsed time is counted in step S209, and when a predetermined time has passed, the processing returns to step S202, and a viewfinder display is performed.

Figure 3:
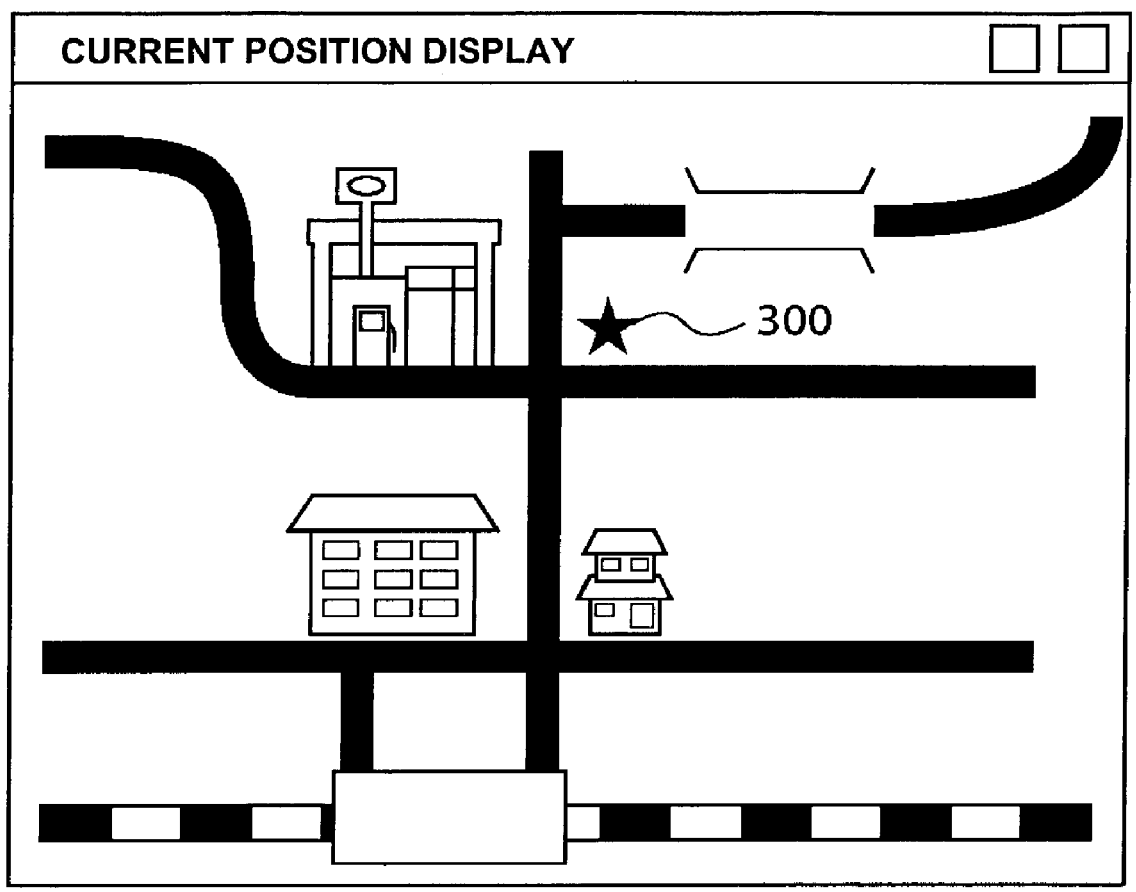
FIG. 3 shows an example of a screen display with a map application.

FIG. 3 shows an example of a displayed screen image created by the map application. A star mark 300 in FIG. 3 is an icon that indicates the current position.

With the composition described above, when the user wants to know the current location, the user merely takes a picture (i.e., picks up an image) that includes a place name plate or a sign that indicates the current position, thereby indicating the current position on a map displayed on the display device. The present embodiment can provide the user with a comfortable operability in searching the current position. Furthermore, the present embodiment can search the current position without having to rely on base stations or satellites, and therefore solve the problems associated with the conventional technology.

In the embodiment described above, the search is initiated upon depressing the switch. However, the present invention is not limited to this particular structure. For example, a search start icon may be displayed on the display screen, and a search may be started upon touching the search start icon on the display screen.

Also, in the embodiment described above, a character recognition is conducted for the picture data that is taken immediately before the search start switch 112 is depressed. However, in another embodiment, a plurality of pictures may be taken and their data may be stored in the secondary storage section 117. One of the pictures that the user wants to perform a character recognition may be selected by the user, a character recognition processing may be performed on the selected picture, and the position at which the selected picture was picked up can be displayed on the map. In this case, the CPU 103 and the display control section 109 may control the display section 108 to display a plurality of size-reduced pictures, so that the user can select one of the pictures by operating a specified operation key (not shown) on the operation section of the apparatus. In a state in which the picture is selected, when the search start switch 112 is depressed, a character string in the selected picture may be recognized by the character recognition application 105. In another embodiment example, the user may operate a specified operation key (not shown) in the operation section of the apparatus such that the CPU 103 and the display control section 109 may control the display section 108 to display successively a plurality of pictures stored in the secondary storage section 117 one by one. A character string in one of the pictures, which is displayed when the search start switch 112 is depressed, may be recognized by the character recognition application 105.

Second Embodiment

In the first embodiment described above, the entire processings are performed by the information processing apparatus. However, if the apparatus is to be equipped with a position information database and a map database on the global scale, a huge memory capacity is required. In this respect, in accordance with the second embodiment, instead of equipping the information processing apparatus with these databases, the databases are provided in a sever apparatus that is provided independently of the information processing apparatus, and the information processing apparatus may be equipped with a communications device to communicate with the server apparatus to perform the processings.

<Hardware Structure of Second Embodiment>

Figure 4:
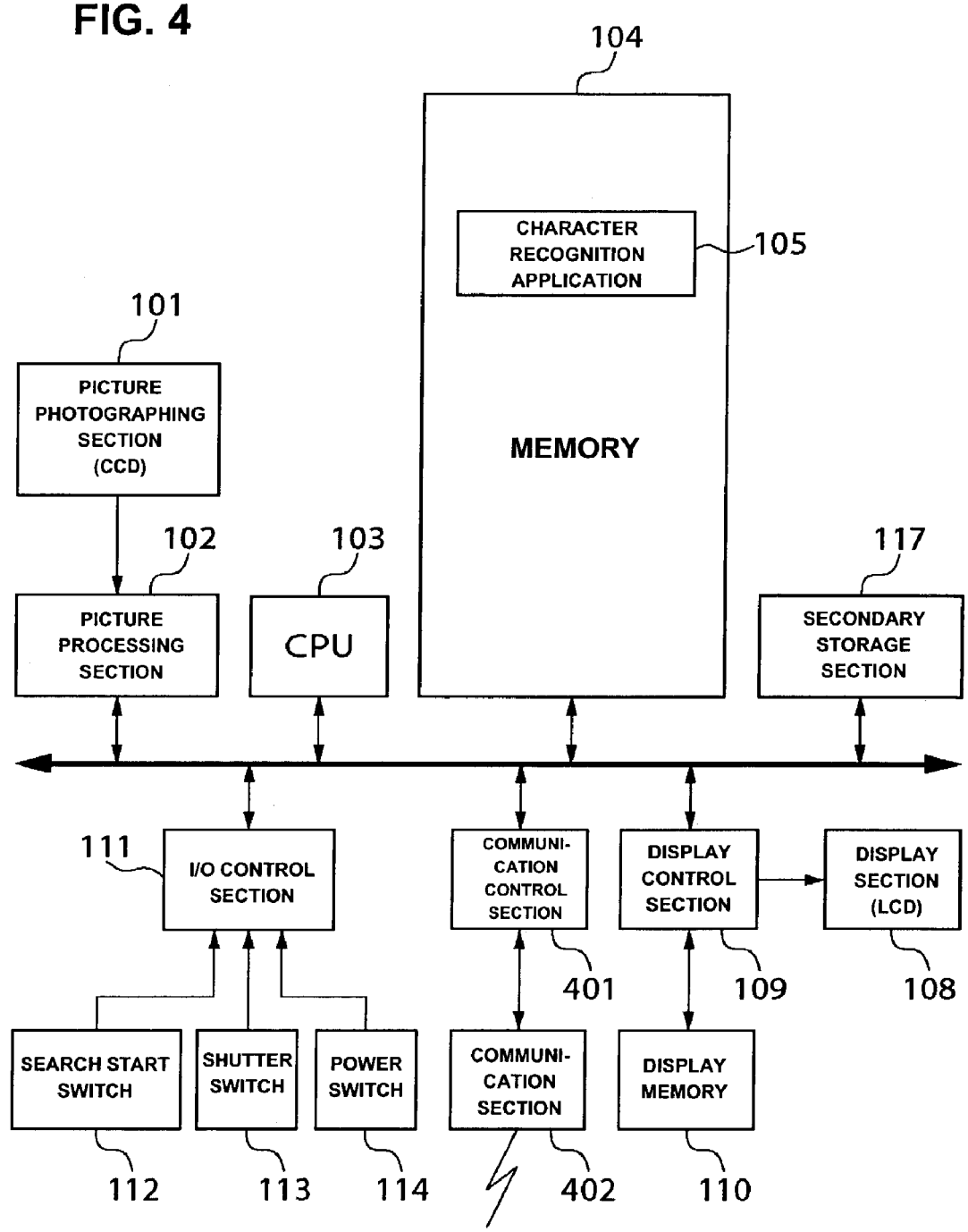
FIG. 4 shows a block diagram of a hardware structure of an information processing apparatus in accordance with a second embodiment of the present invention.

FIG. 4 shows a block diagram of a hardware structure of an information processing apparatus in accordance with a second embodiment of the present invention. The hardware structure is similar to the structure described above with reference to FIG. 1, but additionally includes a communications control section 401 and a communications section 402. The memory 104 stores a character recognition application 105 only. Other applications and databases, such as, a position information database 106, a current position search application 107, a map database 115 and a map application 116 are stored in a server apparatus to be described below.

Figure 5:
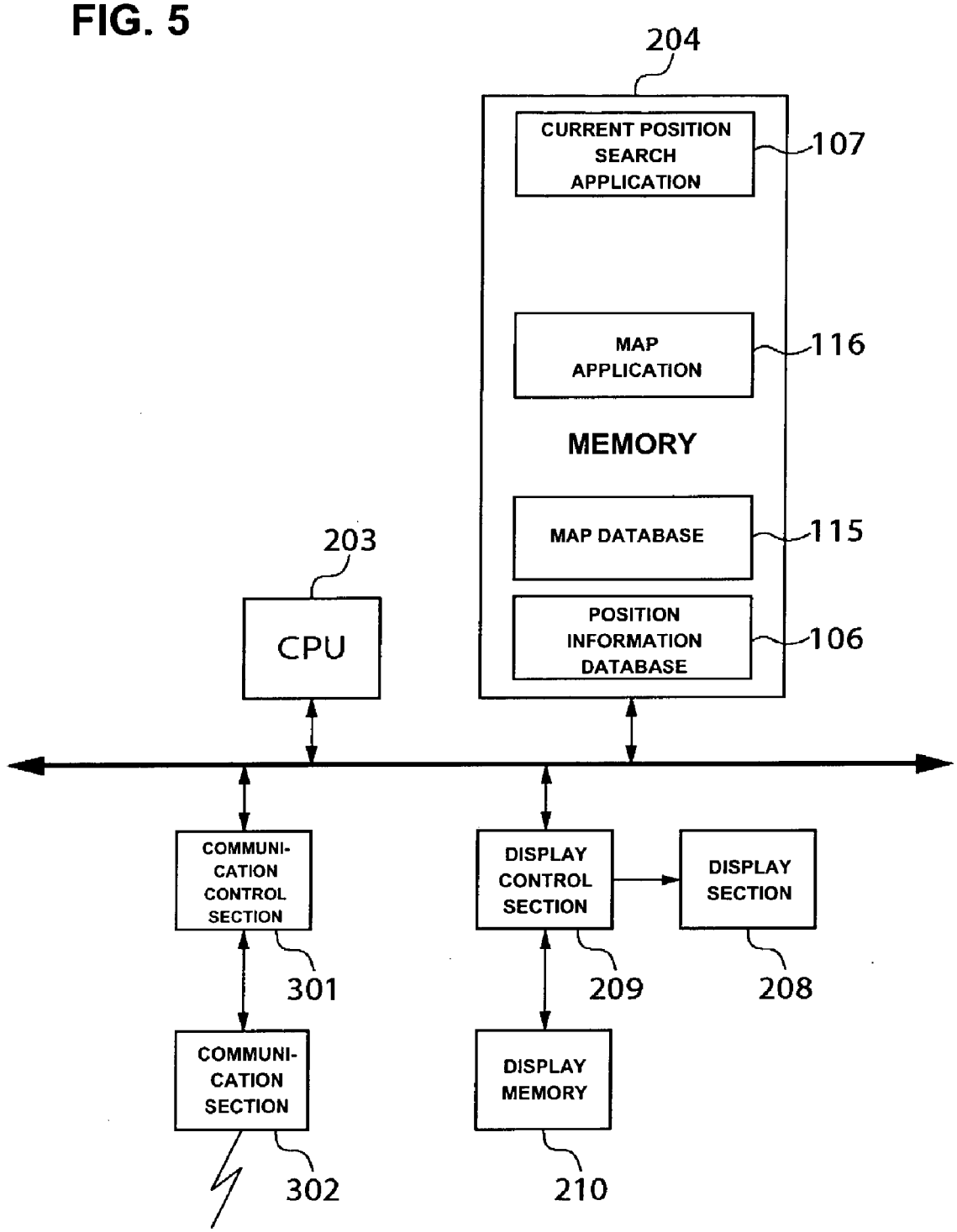
FIG. 5 shows a block diagram of a hardware structure of a server apparatus in accordance with the second embodiment of the present invention.

FIG. 5 shows a block diagram of a hardware structure of a server apparatus in accordance with the second embodiment of the present invention. The server apparatus is equipped with a CPU 203, a memory 204, a display memory 210, a display control section 209, and a display section 208, as well as a communications control section 301 and a communications section 302. The memory 204 stores a position information database 106, a current position search application 107, a map database 115 and a map application 116.

<Operations of Second Embodiment>

Figure 6:
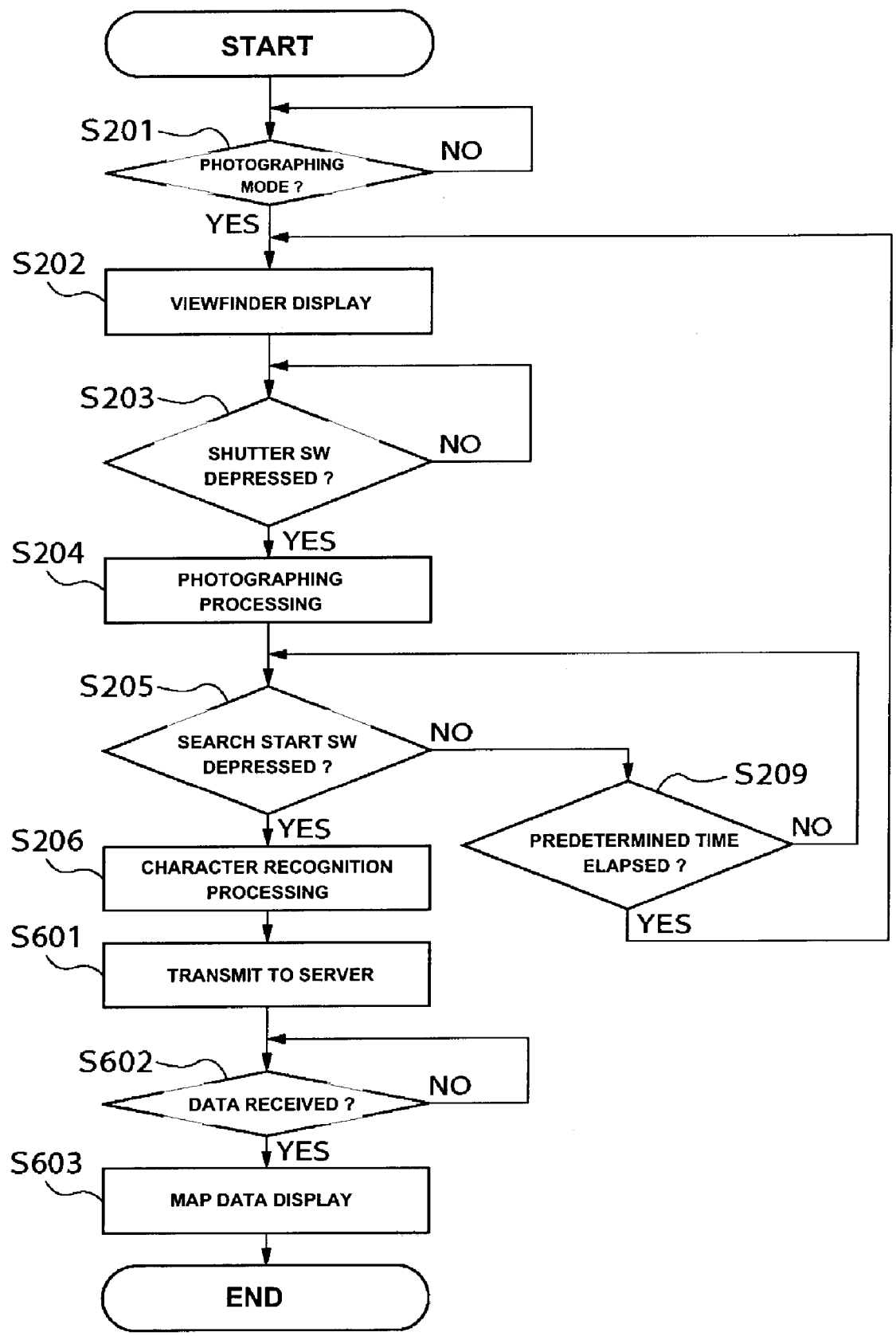
FIG. 6 shows a flow chart of operations performed at the information processing apparatus in accordance with the second embodiment.

Operations performed by the second embodiment will be described below with reference to operation flow charts indicated in FIGS. 6 and 7.

First, referring to the flow chart shown in FIG. 6, operations performed at the information processing apparatus side will be described. It is noted that the same processings as those described above with reference to FIG. 2 will be indicated with the same reference numerals, and their description will be omitted.

Processings in steps S201 through S206 are performed in the same manner as those of the first embodiment, and when a character recognition processing is completed in step S206, character string data obtained as a result of the recognition operation is sent to the communications control section 401. The communications control section 401 transmits the data through the communications section 402 to the server apparatus (step S601).

The information processing apparatus is placed in a standby state until map data is received from the server apparatus in step S602. Upon receiving map picture data from the server apparatus, the processing proceeds to step S603, and the map picture data is delivered to the display control section 109. The display control section 109 writes the picture data in the display memory 110, and displays the picture on the display section 108.

Next, operations performed at the server apparatus side will be described with reference to the flow chart indicated in FIG. 7.

First, in step S701, when the communications section 302 receives the character string data from the information processing apparatus side, the communications control section 301 gives the character string data to the current position search application 107. Upon receiving the character string data, the current position search application 107 compares the character string data with the position information database (step S702).

When position information data that matches the character string data is found, the position information data is delivered to the map application 116. The map application 116 compares the position information data with the map database, and selects map picture data that includes the position information data (step S703). Then, in step S704, the map application 116 sends the map picture data to the communications control section 301. The communications control section 301 transmits the map picture data through the communications section 302 to the information processing apparatus.

With the composition described above in accordance with the second embodiment, the information processing apparatus does not have to be equipped itself with a database of a large capacity, and yet the user can experience a comfortable usability of the apparatus. Also, data that is transmitted from the information processing apparatus to the server apparatus is character string data only, which requires only a light communications traffic.

It the second embodiment also, a plurality of picture data may be stored in the secondary storage section 117, one of the picture data may be selected for desired character recognition, and a character recognition processing may be conducted for the selected picture data.

Third Embodiment

In the embodiments described above, the apparatus is operated when the user wants to know the current position. However, by storing a history of such operations performed by the apparatus, a variety of additional functions may be increased. In accordance with a third embodiment of the present invention, a locus (or loci) can be displayed on a map based on the history.

Figure 8:
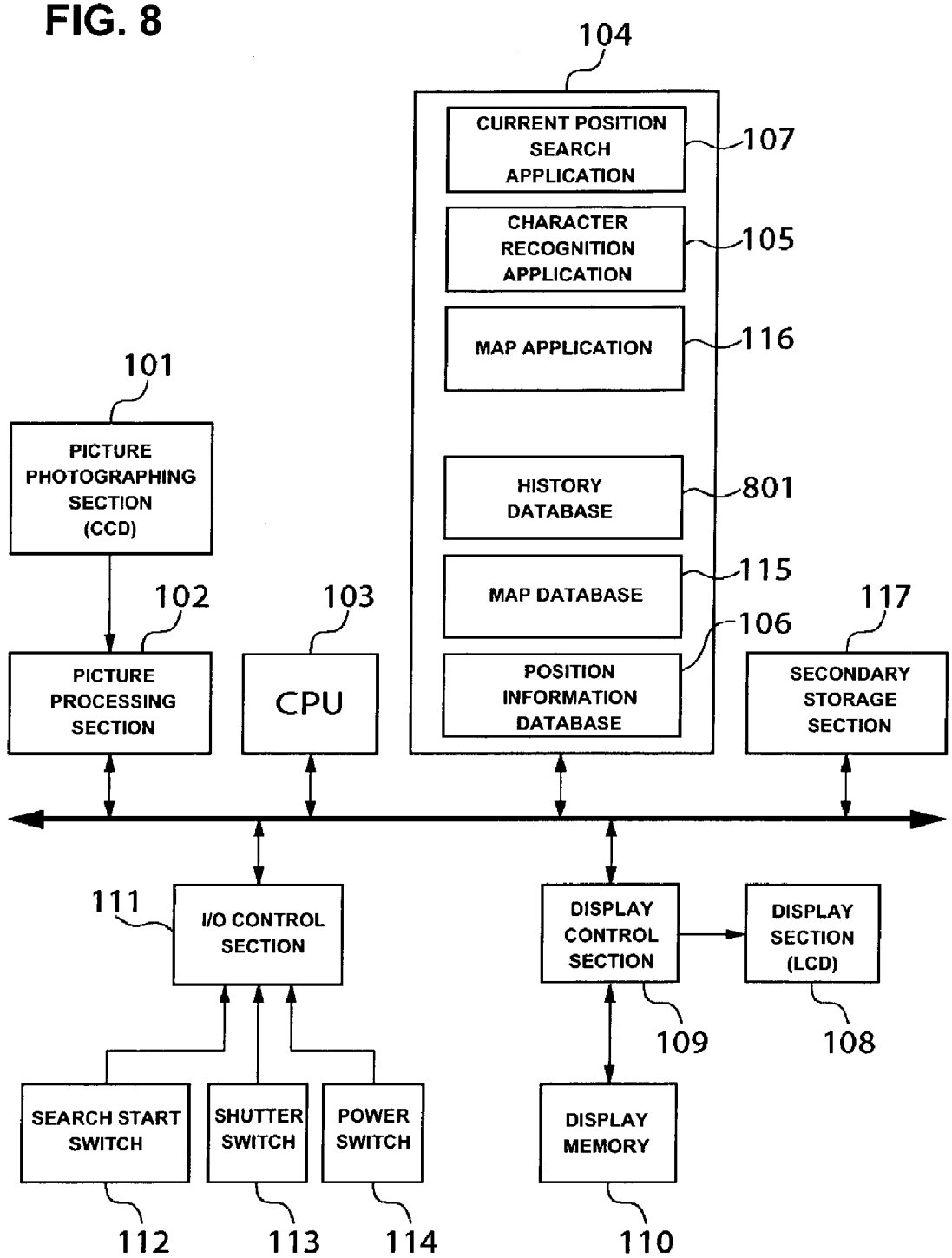
FIG. 8 shows a block diagram of a hardware structure of an information processing apparatus in accordance with a third embodiment of the present invention.

FIG. 8 shows a block diagram of a hardware structure of an information processing apparatus in accordance with a third embodiment of the present invention.

The third embodiment differs from the first embodiment shown in FIG. 1 in that the memory 104 stores a history database 801 that records search results.

Figure 9:
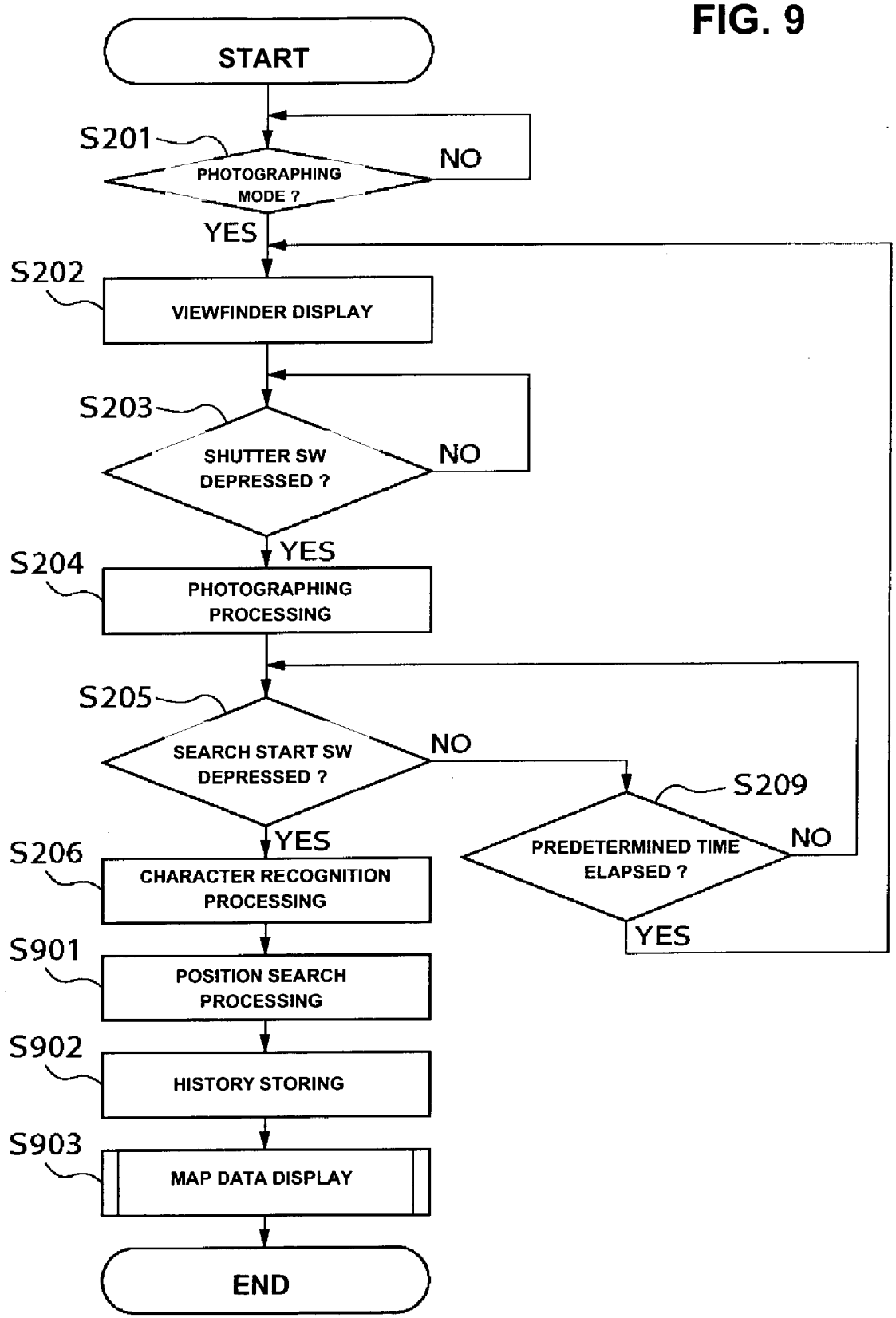
FIG. 9 shows a flow chart of operations performed by the information processing apparatus in accordance with the third embodiment.

FIG. 9 shows a flow chart of operations performed by the third embodiment.

Figure 2:
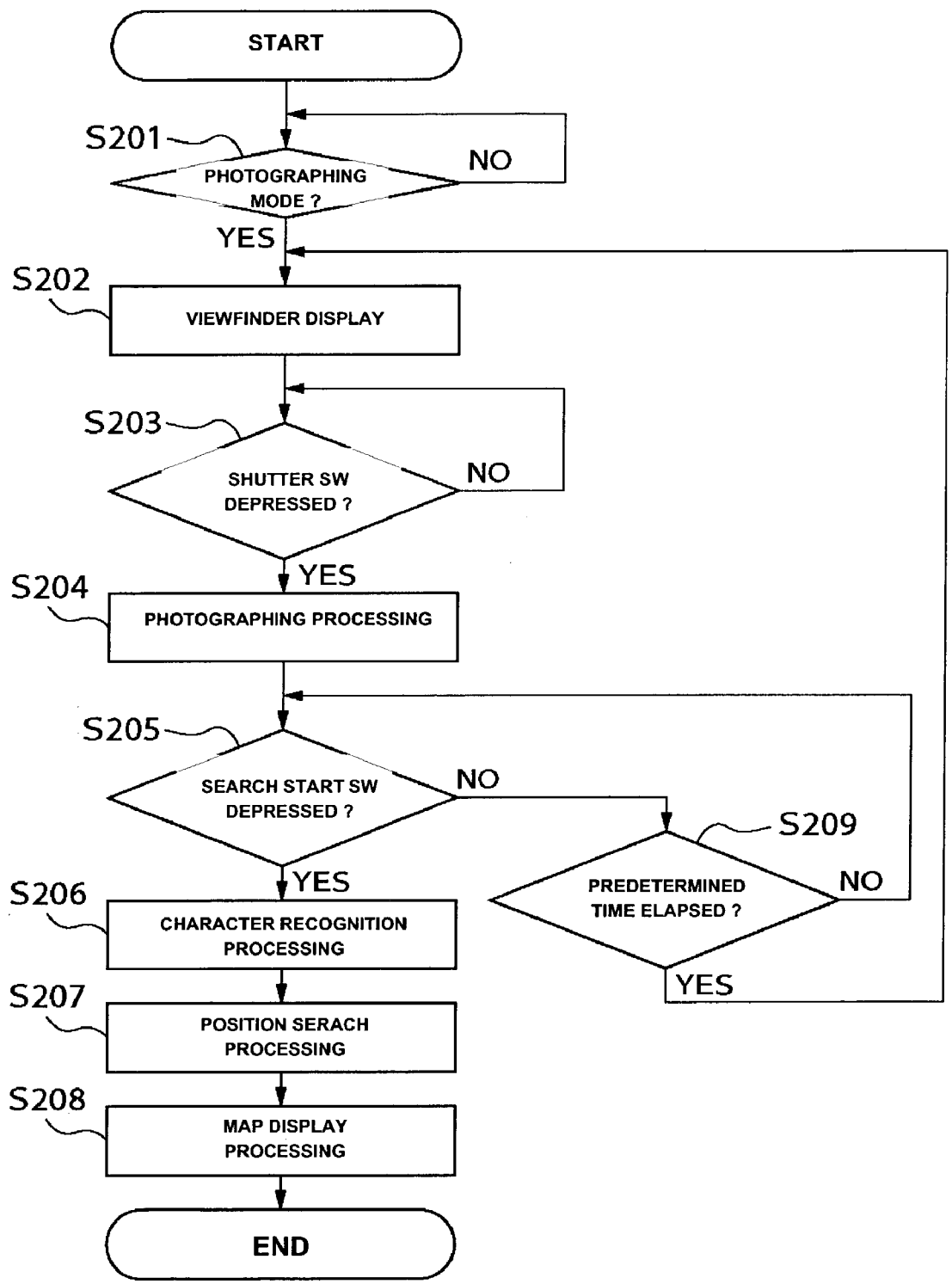
FIG. 2 shows a flow chart of operations performed by the information processing apparatus in accordance with the first embodiment.

Operations from step S201 to a character recognition processing in step S206 may be the same as those in the operation flow indicated in FIG. 2. A character recognition result is sent to the position search application 107 in step S901 and is subject to a position search processing. A position search processing result is sent to the map application 116, and also stored in the history database 801 in step S902.

FIG. 10 shows an example of a data format stored in the history database 801.

FIG. 10 shows a memory map of the entire history database 1101, which contains history data 1102 through 1107. Each of the history data stores contents indicating, from the left side of the figure, the time when a picture was taken, the latitude and longitude of a position search result, and a file name of the picture taken. By storing times at which position search processings are conducted, the search results are managed as history data.

Then in step S903, the current position is displayed on a map.

Figure 11:
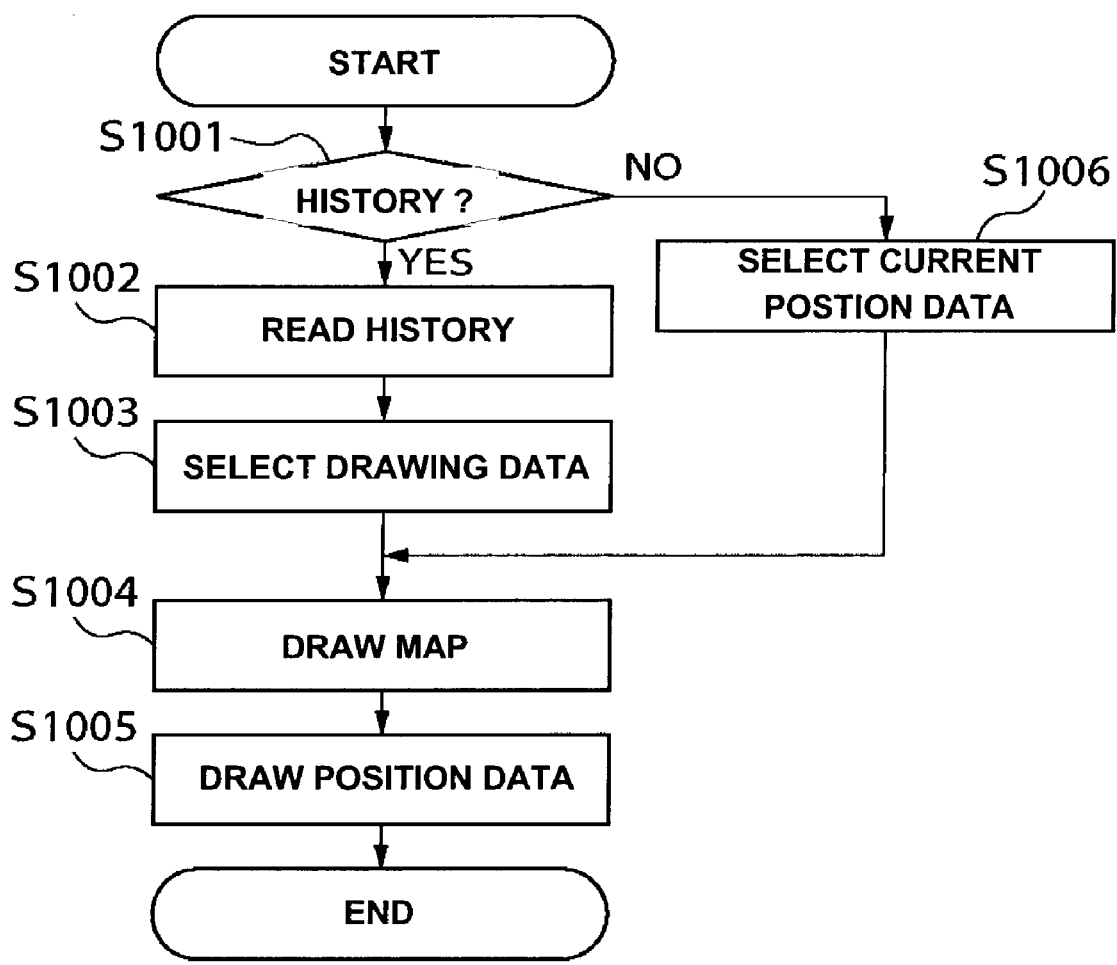
FIG. 11 shows a flow chart in detail of a map display processing in step S903 in FIG. 9.

FIG. 11 shows a flow chart in detail of a map display processing in step S903 in FIG. 9.

In the map display processing indicated in FIG. 11, a determination is made in step S1001 as to whether or not the history database stores history data. If history data is stored in the history database, the processing proceeds to step S1002, and the history data stored so far are read out. Next, in step S1003, data that are to be used for drawing a locus are selected from among the history data. More specifically, the time and position of the latest history data (that indicates the current position data) are compared with those of the other history data, and those of the history data that are outside a predetermined distance range or a predetermined time range are unselected for drawing a locus.

For example, in the example shown in FIG. 10, the latest history data (i.e., the current position data) is the one indicated by reference numeral 1107. In this case, the history data 1102, 1103 and 1104 may be unselected for drawing a locus because the time of these history data is too old (i.e., outside a predetermined time range). Also, the history data 1105 is unselected for drawing a locus because the indicated location is too far (i.e., outside a predetermined distance range). It can be assumed that the history data 1102 through 1104 might have been obtained through photographing in a substantially different time frame, and the history data 1105 might have been obtained through photographing during a high-speed transportation on, for example, an airplane, or might indicate, for example, a sign at a sightseeing spot, and thus store the position data representing the sightseeing spot.

In step S1004, a map is drawn in a manner that the latest history data (the current position data) is located at the center of the map. Further, in step S1005, the selected history data are drawn on the map, and chronologically connected from one location to another to thereby indicate them as a locus.

Also, in step S1001, if the history database contains only the latest history data (i.e., the current position data), the current position data is selected in step S1006, and a map and current position data are displayed in step S1004 and step S1005.

Figure 12:
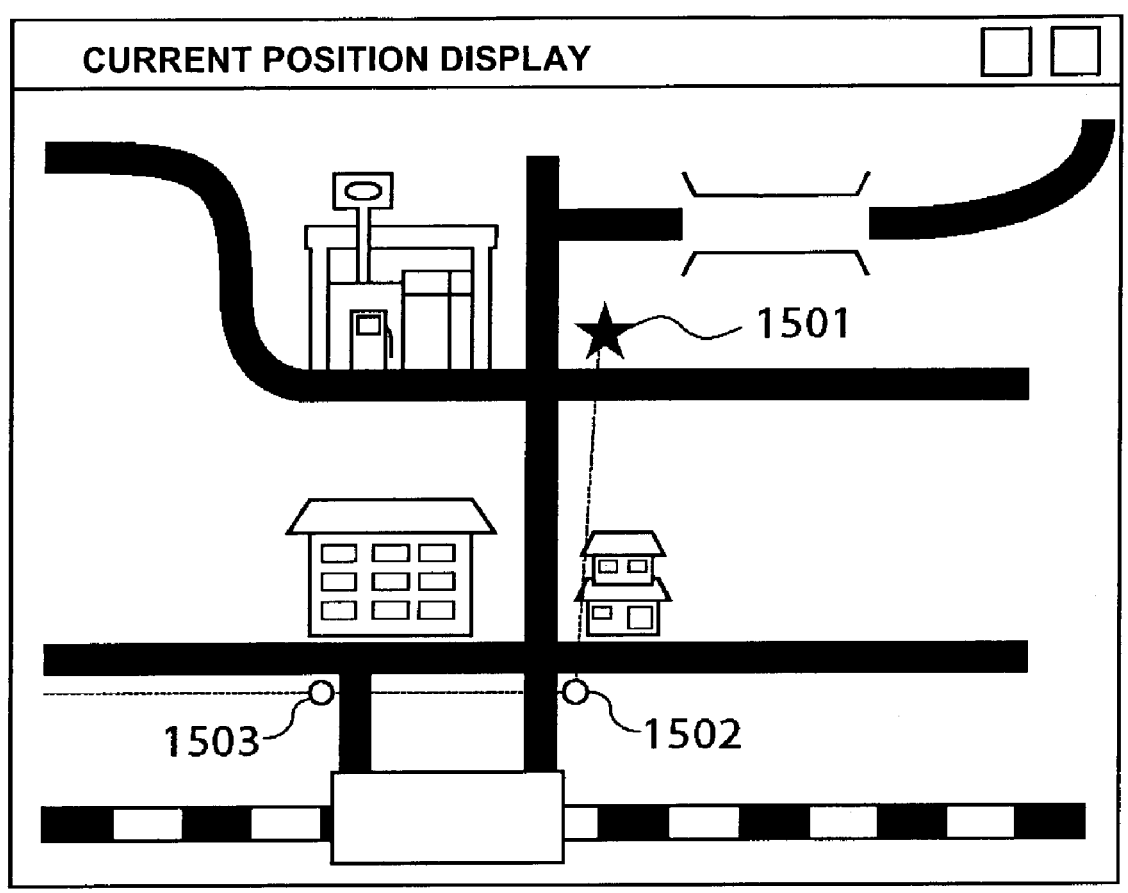
FIG. 12 shows an example of a screen display with a map application in accordance with the third embodiment.

FIG. 12 shows an example of the displayed picture showing the map of the current position. An icon 1501 in the figure indicates the current position, and an icon 1502 indicates a position of a picture taken before the current position, and an icon 1503 indicates a position of a picture taken before the location indicated by the icon 1502. These icons are connected by a dotted line to indicate a locus.

When any one of the displayed icons on the display device is tapped or touched, the history data in the history database 801 is searched, and a picture taken at the position indicated by the touched icon may be displayed on the display device. For example, when the icon 1502 is tapped, and the data 1106 in FIG. 10 corresponds to the icon 1502, the corresponding picture is 00013.jpg. Accordingly, the picture is read out from the secondary storage section 117, and displayed on the display device.

By the operations described above, not only the current position, but also the past position data that have been searched are displayed. This is effective in providing useful information to the user. Furthermore, data of the positions visited can be displayed chronologically as a locus, the user can confirm the route in which the user has moved along.

Also, since pictures taken corresponding to any of the positions indicated on the displayed route can be readily displayed, the user can readily retrace his/her memory. Furthermore, history data are selectively displayed based on the time and locations, and unnecessary history data are not displayed. In other word, only history data necessary for the user can be displayed.

Fourth Embodiment

In the embodiments described above, attributes of character strings in pictures taken are not considered. By considering these attributes, information in a format that is desired by the user can be securely provided. In accordance with a fourth embodiment, information displayed when a character string in a picture taken indicates a place name plate is different from information displayed when a character string in a picture taken indicates a station name sign board.

Figure 13:
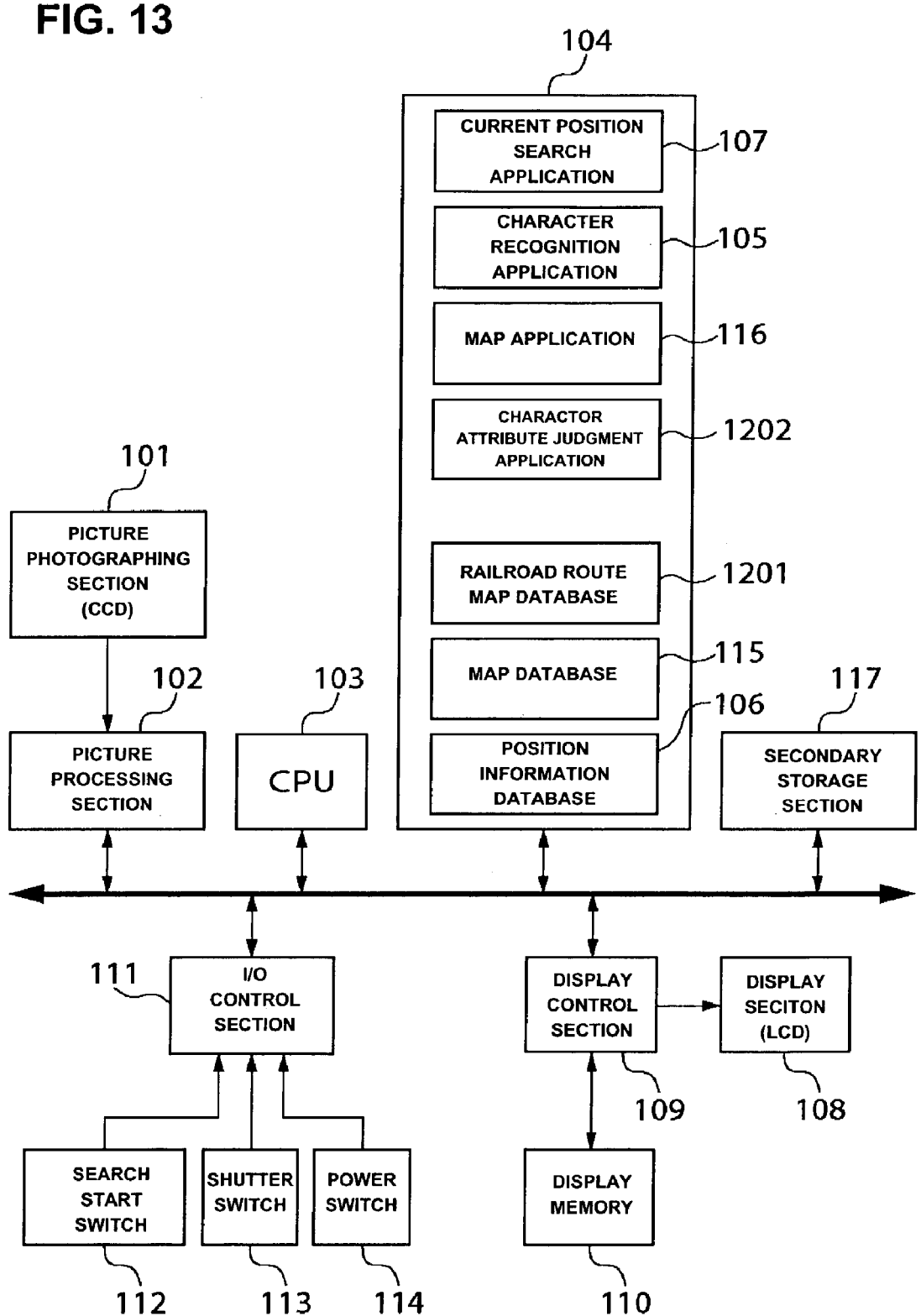
FIG. 13 shows a block diagram of a hardware structure of an information processing apparatus in accordance with a fourth embodiment of the present invention.

FIG. 13 shows a block diagram of a hardware structure of an information processing apparatus in accordance with a fourth embodiment of the present invention.

The fourth embodiment is different from the first embodiment shown in FIG. 1 in that the memory 104 stores a railroad route map database 1201 that stores railroad routes information and a character attribute judgment application 1202 that judges attributes of characters.

Figure 14:
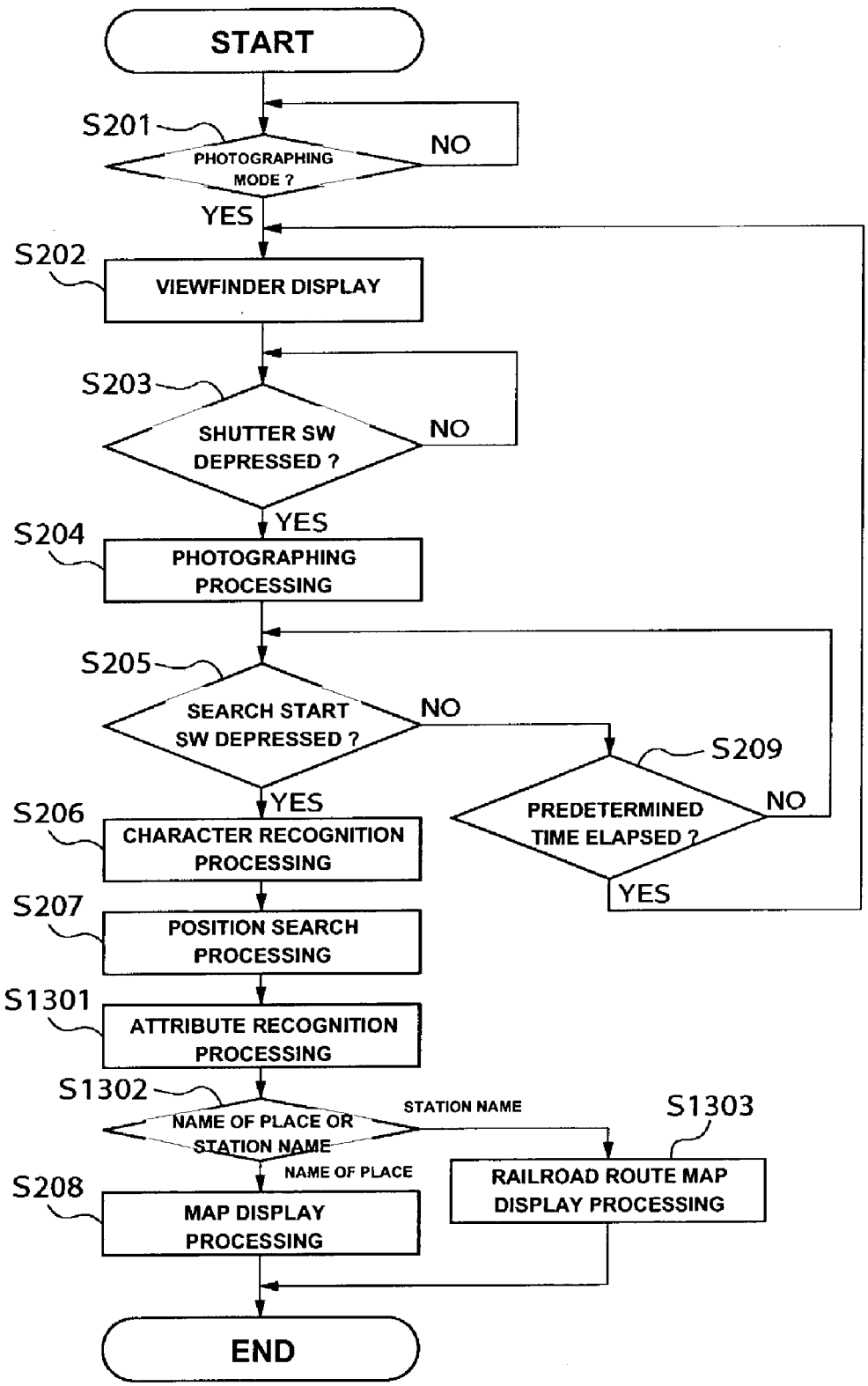
FIG. 14 shows a flow chart of operations performed by the information processing apparatus in accordance with the fourth embodiment.

Operations performed by the fourth embodiment will be described below with reference to a flow chart indicated in FIG. 14.

Operations from a photographing mode judgment processing in step S201 to a position search processing in step S207 may be the same as those of the first embodiment. When the position search processing in step S207 is completed, the processing proceeds to step S1301, wherein the character attribute judgment application 1202 is started, and a judgment is made as to whether the picture taken and characters indicate a name of place or a station name. Judgment criteria may be as follows, for example:

(1) For judgment based on character string:
  (a) When the last character of the character string is "Station", the character string indicates a station.
  (b) Other than the above, the character string indicates a name of place.
(2) For judgment based on picture:
  (a) When the character string is arranged in a manner indicated in FIG. 15, the character string indicates a station name. More specifically, when three sets of characters that are identically pronounced are written in Hiragana character, Kanji character and Roman character in an upper central section, and two sets of characters that are identically pronounced are written in Hiragana character and Roman character in each of lower left and lower right sections, the character string indicates a station name.
  (b) Other than the above, the character string indicates a name of place.

In either of the judgments (1) and (2) above, if it is judged that the character string indicates a station name, a determination is made that the picture taken shows the station name.

When it is determined that the character string indicates the station name, the processing proceeds to step S1303 wherein a railroad route map including the station name is searched from the railroad route map data 1201. Next, a result of the search is read out, and displayed on the display device. Also, the name of the current position (the current station) is displayed.

When it is determined that the character string indicates a name of place (except a station name), the processing proceeds to step S208, and a map in which the current position is marked is displayed like the first embodiment.

By the operations described above, the format of information to be displayed can be changed depending on attributes of pictures taken, such that the user can readily obtain desired information. In the fourth embodiment example, attributes of names of place and station names are judged and the display format is changed according to the judgment made. However, the present invention is not limited to this example.

Figure 7:
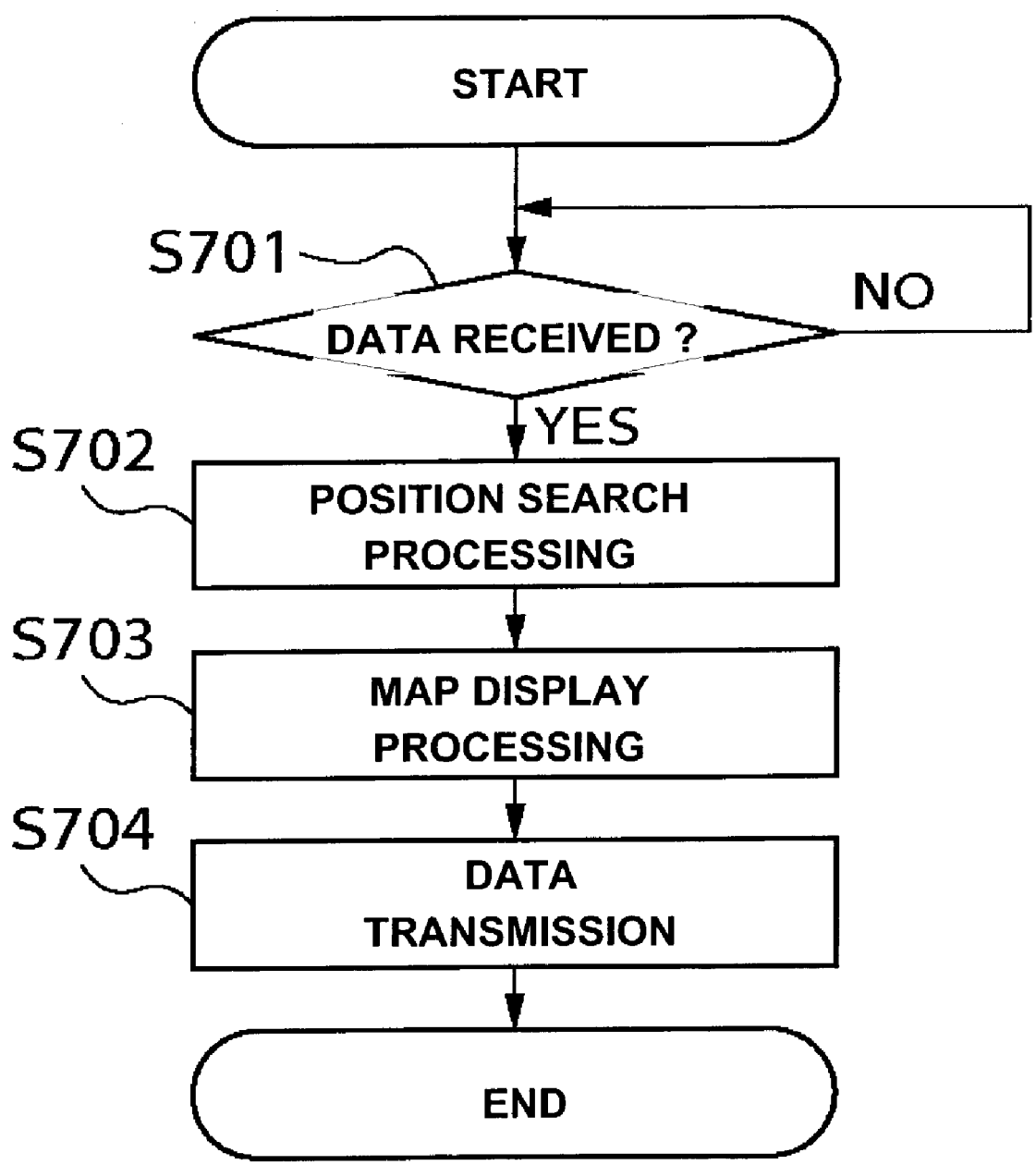
FIG. 7 shows a flow chart of operations performed at the server apparatus in accordance with the second embodiment

It is noted that programs for executing operations according to the flow charts indicated in FIGS. 2, 6, 9, 11 and 14 may be stored in the memory 104 in the information processing apparatus, and a program for executing operations according to the flow chart indicated in FIG. 7 may be stored in the memory 204 in the server apparatus. Through executing the programs stored, the control methods according to the embodiments described above are realized.

The present invention may be applicable to a system that is composed of a plurality of apparatuses (for example, a host computer, interface devices, readers, printers and the like), or to a unit that is composed of a single apparatus (for example, a copy machine, a facsimile machine or the like).

The present invention can be achieved by having a storage medium that stores program codes of software that realize the functions of the embodiments described above supplied to a system or an apparatus, and by having a computer (or a CPU or an MPU) of the system or the apparatus read and execute the program codes stored in the storage medium.

In this case, the program codes themselves that are read from the storage medium realize the functions of the embodiment of the present invention, and the storage medium that stores the program codes constitute the present invention.

The storage medium to supply the program codes may be, for example, a floppy® disk, a hard disk, an optical disk, an optical magnetic disk, a DVD, a CD-ROM, a CD-R, a magnetic tape, a nonvolatile memory card, or a ROM.

Furthermore, the present invention is applicable not only when the program codes read by a computer are executed to realize the functions of the embodiments, but also when an operating system that operates on the computer performs a part or all of the actual processing based on the instructions contained in the program codes and thereby realizes the functions of the embodiments.

Moreover, the present invention is also applicable when the program codes that are read from the storage medium are written on a memory of an expansion board inserted into a computer or of an expansion unit connected to a computer, and a CPU provided on the expansion board or on the expansion unit performs a part or all of the actual processing based on the instructions contained in the program codes and thereby realizes the functions of the embodiments.

As described above, in accordance with the present invention, photographed locations where pictures are taken can be specified without having to depend on base stations or satellites, and can be displayed on a map. For example, by merely taking a picture including a place name indication plate or a sign that indicates the current position, the user can readily be informed of the current position of the apparatus.

Also, a route that indicates changes of photographed positions can be displayed on a map, such that the route in which the user has moved along can be readily confirmed.

Further, maps that match photographed characters, such as, road maps or railroad route maps can be displayed, in other words, maps according to specific purposes can be displayed, and positions determined based on the characters can also be displayed. This improves the usability of the position tracking apparatuses.

Also, since photographed pictures may be stored and positions can be determined based of selected ones of the photographed pictures, places that have been visited in the past can be readily confirmed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing apparatus comprising:
 a recognizing unit that recognizes a picked up character string on a picked up image;
 a storage unit that stores geographic position information determined based on the character string recognized by the recognizing unit; and
 a display unit that displays on a map a locus of picked up positions of images based on a plurality of geographic position information stored in the storage unit.

2. An information processing apparatus according to claim 1, wherein the display unit indicates marks of picked up positions of the images on the locus and, when one of the marks is selected, displays an image that is picked up at a position indicated by the one of the marks selected.

3. An information processing apparatus according to claim 1, further comprising:
 a map storage unit that stores map information; and
 a judging unit that judges geographic position information indicated by the character string recognized by the recognizing unit based on the character string recognized by the recognizing unit and the map information stored in the map storage unit,
 wherein the storage unit stores the geographic position information judged by the judging unit.

4. An information processing apparatus according to claimed 1, further comprising:
 a pick up unit that images,
 wherein, when an instruction is given within a predetermined time range from the time the image was picked up by the pick up unit, the recognizing unit starts the recognizing processing.

5. An information processing apparatus according to claim 1, further comprising:
 a pick up unit that images;
 an image storing unit that stores a plurality of images picked up by the pick up unit; and
 a selection unit that selects any one of the plurality of images stored in the image storing unit,
 wherein the recognizing unit recognizes the picked up character string on the image selected by the selection unit.

6. A method for displaying positions, the method comprising the steps of:
 recognizing a picked up character string on a picked up image;
 storing in a memory geographic position information judged based on the character string recognized by the recognizing step; and
 displaying on a map a locus of picked up positions of images based on a plurality of geographic position information stored in the memory.

* * * * *